(12) United States Patent
Boehl

(10) Patent No.: US 9,575,933 B2
(45) Date of Patent: Feb. 21, 2017

(54) CIRCUIT ARRANGEMENT AND METHOD FOR EVALUATING SIGNALS OF A CRANKSHAFT SENSOR AND OF A CAMSHAFT SENSOR OF AN INTERNAL COMBUSTION ENGINE

(75) Inventor: Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1063 days.

(21) Appl. No.: 13/637,170

(22) PCT Filed: Mar. 31, 2011

(86) PCT No.: PCT/EP2011/054997
§ 371 (c)(1),
(2), (4) Date: Dec. 17, 2012

(87) PCT Pub. No.: WO2011/121066
PCT Pub. Date: Oct. 6, 2011

(65) Prior Publication Data
US 2013/0096872 A1    Apr. 18, 2013

(30) Foreign Application Priority Data

Mar. 31, 2010 (DE) ........................ 10 2010 003 524

(51) Int. Cl.
*G01C 9/00* (2006.01)
*G06F 17/18* (2006.01)
(Continued)

(52) U.S. Cl.
CPC ............. *G06F 17/18* (2013.01); *F02D 41/009* (2013.01); *F02D 41/222* (2013.01); *Y02T 10/40* (2013.01)

(58) Field of Classification Search
CPC ...... G06F 17/18; F02D 41/009; F02D 41/222; F02D 2041/001; F02D 2041/1433; F02D 2250/18
(Continued)

(56) References Cited

U.S. PATENT DOCUMENTS 4,133,323 A    1/1979  Adler
5,417,187 A *  5/1995  Meyer et al. ............... 123/90.17
(Continued)

FOREIGN PATENT DOCUMENTS

CN    1441158    9/2003
CN    1643242    7/2005
(Continued)

OTHER PUBLICATIONS

International Search Report for PCT/EP2011/054997, dated Jul. 15, 2011.

*Primary Examiner* — Gregory J Toatley
*Assistant Examiner* — Eman Alkafawi
(74) *Attorney, Agent, or Firm* — Norton Rose Fulbright US LLP; Gerard Messina

(57) ABSTRACT

A circuit assemblage and a method for evaluating signals of a crankshaft sensor and of a camshaft sensor of an internal combustion engine are provided, the times at which the signals occur being evaluated. A position signal of a shaft of the internal combustion engine is formed from the times. Storage units are provided which simultaneously store the occurrence times of the signals of the crankshaft sensor and the occurrence times of signals of the camshaft sensor. A decision unit is provided as to whether the position signal is formed from the occurrence times of the signals of the crankshaft sensor or from the occurrence times of the signals of the camshaft sensor.

5 Claims, 3 Drawing Sheets

(51) Int. Cl.
*F02D 41/00* (2006.01)
*F02D 41/22* (2006.01)

(58) Field of Classification Search
USPC ............ 702/151, 150, 147; 701/61, 41, 103;
307/9.1; 310/12.27
See application file for complete search history.

(56) References Cited

U.S. PATENT DOCUMENTS

| | | |
|---|---|---|
| 5,460,134 A | 10/1995 | Ott et al. |
| 2005/0096865 A1* | 5/2005 | Sugiura et al. ............... 702/151 |
| 2006/0152226 A1* | 7/2006 | Steinruecken et al. ....... 324/509 |
| 2007/0246012 A1* | 10/2007 | Ando .................... F02D 41/009 |
| | | 123/406.13 |
| 2009/0190283 A1* | 7/2009 | Hammerschmidt et al. . 361/240 |
| 2010/0006065 A1* | 1/2010 | Tripathi et al. ............... 123/350 |
| 2010/0131176 A1* | 5/2010 | Ide ...................... F01L 13/0021 |
| | | 701/103 |
| 2011/0132307 A1* | 6/2011 | Patterson et al. .......... 123/179.3 |

FOREIGN PATENT DOCUMENTS

| | | |
|---|---|---|
| DE | 102 04 196 | 8/2003 |
| DE | 10 2006 000049 | 9/2006 |
| EP | 1 327 761 | 7/2003 |

\* cited by examiner

CIRCUIT ARRANGEMENT AND METHOD FOR EVALUATING SIGNALS OF A CRANKSHAFT SENSOR AND OF A CAMSHAFT SENSOR OF AN INTERNAL COMBUSTION ENGINE

BACKGROUND OF THE INVENTION

1. Field of the Invention

The present invention relates to a method for evaluating signals of a crankshaft sensor.

2. Description of the Related Art

Published German patent application document DE 43 27 218 A has already disclosed a circuit assemblage and a method for evaluating signals of a crankshaft sensor and of a camshaft sensor, in which the one or the other method is carried out alternatively in each case.

BRIEF SUMMARY OF THE INVENTION

The circuit assemblage according to the present invention and the method according to the present invention have the advantage that at least one first step, of acquiring the sensor data both for the crankshaft sensor and for the camshaft sensor simultaneously, occurs. It is thus possible at any time, while operation is ongoing, to switch over from a calculation based on one of the sensors to a calculation based on the other sensor. It is not necessary to wait, in this context, for the input of new sensor signals. A very rapid switchover of control of the internal combustion engine in the case of failure of one of the sensors can thus occur. The additional outlay required therefore is moreover very small.

In particularly simple fashion, the stored times are used to predict a time in the future at which a sensor signal will occur, from which, in particularly simple fashion, counting pulses for a position counter 11 can be generated. This circuit can also be embodied particularly simply as a digital phase locked loop. The switchover occurs on the basis of monitoring means of the sensors. These can, for example, co-utilize normal monitoring functions of the internal combustion engine.

DETAILED DESCRIPTION OF THE INVENTION

Figure 1:
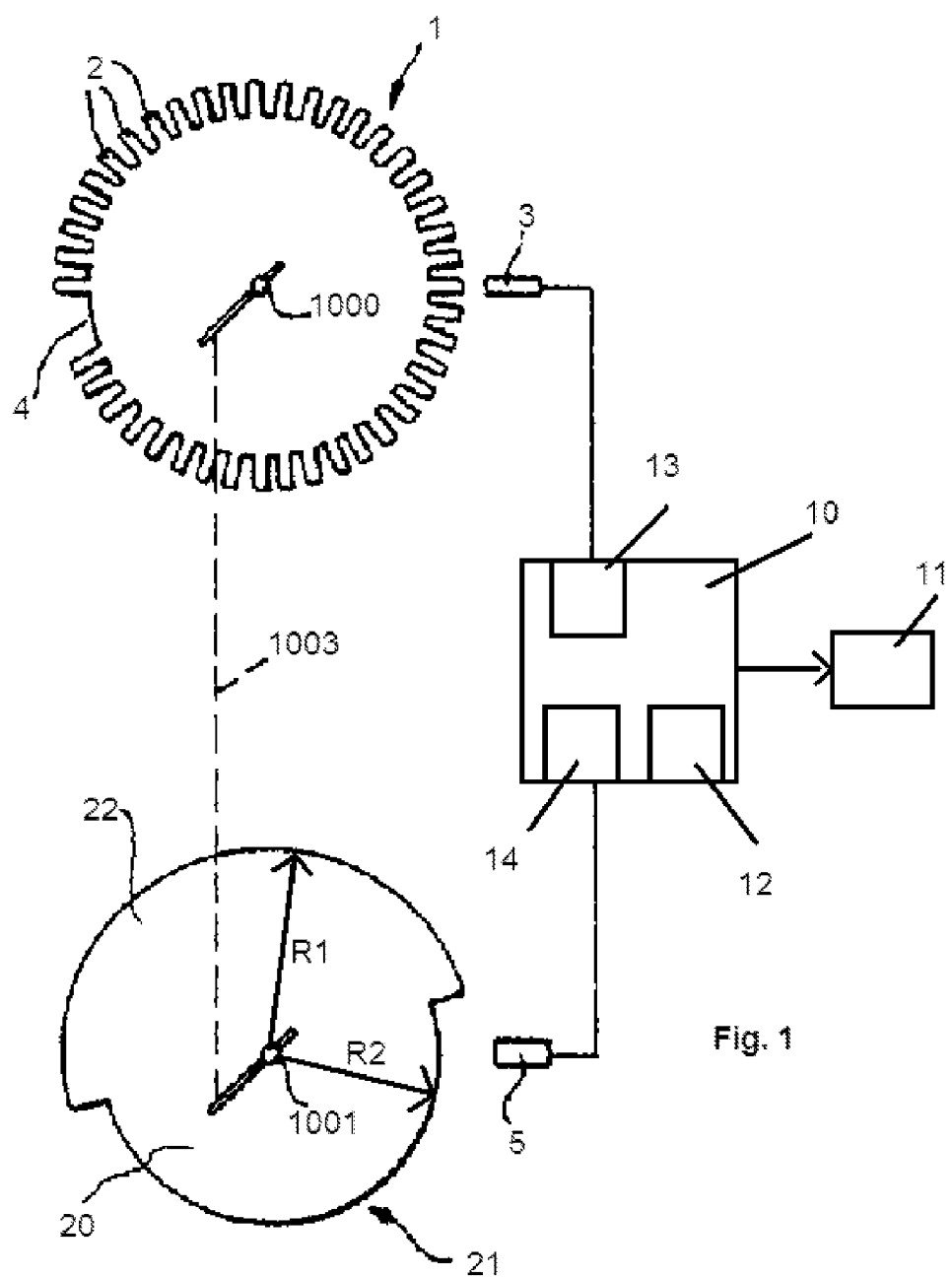
FIG. 1 shows a crankshaft sensor and a camshaft sensor.

FIG. 1 schematically shows a crankshaft 1000 and a camshaft 1001 of a conventional internal combustion engine. These two shafts are rigidly coupled to one another by the mechanical structure of the internal combustion engine, as symbolized in FIG. 1 by connecting line 1003. This rigid coupling means that a fixed relationship exists between the camshaft and the crankshaft, although the crankshaft rotates two revolutions for each revolution of the camshaft. The purpose of the circuit assemblage according to the present invention and of the method according to the present invention is to make available, for further calculations of an engine control system, a position signal that contains a datum regarding the respective position of the internal combustion engine, i.e. of crankshaft 1000 and of camshaft 1001. The resolution of this signal is considerably finer than is possible by way of the pitch, shown in FIG. 1, of the corresponding encoder wheels. Crankshaft 1000 is connected to a crankshaft encoder wheel 1. Crankshaft encoder wheel 1 has on its outer side a plurality of teeth 2 that are scanned by a crankshaft sensor 3. Crankshaft sensor 3 has in each case a first signal level, for example a High signal, whenever a tooth is located directly in front of crankshaft sensor 3. When a tooth gap, i.e. the interstice between two teeth 2, is located directly in front of crankshaft sensor 3, crankshaft sensor 3 then has a different signal level, for example a Low level. Crankshaft sensor 3 thus supplies a sequence of square-wave pulses between the Low and High levels, by way of which the motion of teeth 2 of crankshaft encoder wheel 1, and thus also the rotation of crankshaft 1000, can be measured. Also particularly indicated is a point on crankshaft encoder wheel 1 in which several teeth 2 are not provided. This tooth gap 4 produces a Low level in crankshaft sensor 3 for a longer period of time, with the result that a position of crankshaft 1000 can be unambiguously characterized.

Camshaft 1001 is correspondingly connected to a camshaft encoder wheel 20. Camshaft encoder wheel 20 has a first region 21 having a first radius R1. Camshaft encoder wheel 20 further has a second region 22 having a second radius R2. R1 is considerably larger than R2. First region 21 extends over 180°, and second region 22 having radius R2 likewise extends over 180°. When first region 21 having radius R1 moves past camshaft sensor 5, camshaft sensor 5 then outputs a signal having a first signal level, for example a High signal level. When second region 22 having radius R2 moves past camshaft sensor 5, camshaft sensor 5 then outputs a signal having a second level, for example a Low level.

The signals of crankshaft sensor 3 and of camshaft sensor 5 are sent to a circuit assemblage 10 for further processing. Circuit assemblage 10 has an internal clock 12 and a switching logic system 13 for evaluating the signals of crankshaft sensor 3, and a switching logic system 14 for evaluating the signals of camshaft sensor 5. The operation of these switching logic systems 13 and 14 is described later on with reference to FIG. 6. Circuit assemblage 10 generates position pulses P that are added up in a position counter 11. Position counter 11 therefore also has a datum that corresponds to the position of the internal combustion engine, i.e. the position of crankshaft 1000 or of camshaft 1001. Further processing within circuit assemblage 10 is explained in further detail in the Figures that follow.

Figure 2:
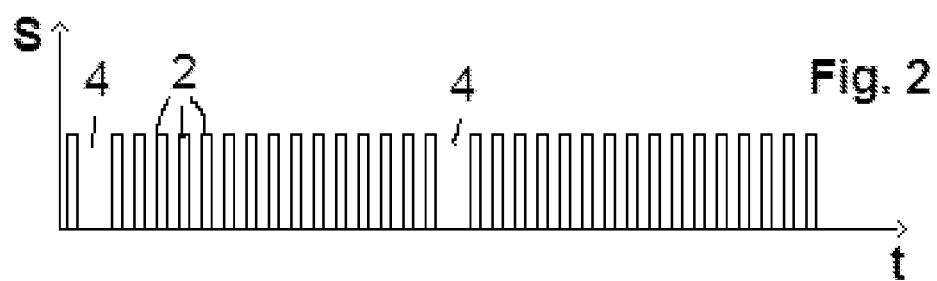
FIG. 2 shows signals of the crankshaft sensor.

FIG. 2 schematically depicts the signals S of crankshaft sensor 3 plotted against time t. Two revolutions of crankshaft 1000 are schematically depicted. In FIG. 2, the signals of teeth 2 are labeled 2, and the signal of tooth gap 4 of crankshaft encoder wheel 1 is labeled 4. The number of pulses shown for teeth 2 does not correspond to the number of teeth that are depicted in FIG. 1; this is merely a schematic depiction of this signal. In real crankshaft encoder wheels 1, for example, (60-2) teeth and a tooth gap 4 of two teeth are used, so that 58 square-wave pulses, as shown in FIG. 2, occur for one revolution of crankshaft 1000. Tooth gap 4 can be reliably detected because of the missing teeth of this gap, and by counting from tooth gap 4 it is possible to determine the crankshaft's position at the respective time.

Figure 3:
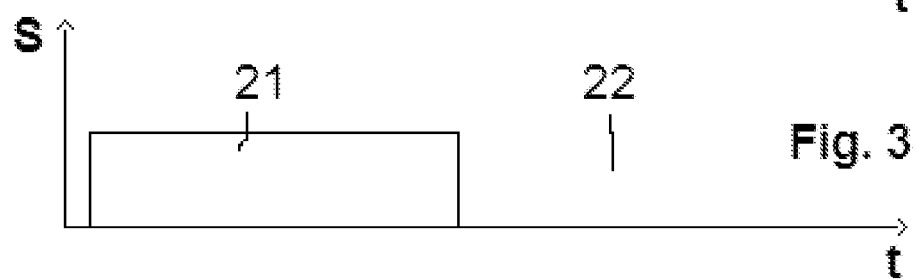
FIG. 3 shows signals of the camshaft sensor.

FIG. 3 shows the signal S of camshaft sensor 5 plotted against time t. As is evident, the signal exhibits a very long High level as long as segment 21 is located in front of camshaft sensor 5. For the remainder of the revolution of camshaft encoder wheel 20 the signal level is at the Low level, as shown in FIG. 3.

The signals of crankshaft sensor 3 and of camshaft sensor 5 can now be respectively used to calculate a position signal of the internal combustion engine. This position signal of the internal combustion engine is required for further calculations, in particular in order to control the combustion operations of the internal combustion engine. Combustion operations of this kind require that actuators, for example fuel inject valves or ignition coils, be actuated at specific positions of the internal combustion engine; very accurate information regarding the position of the internal combustion engine is necessary for precise control of these operations.

Figure 4:
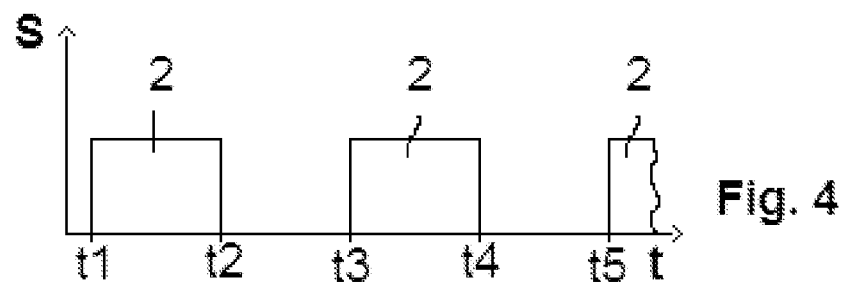
FIG. 4 shows signals of the crankshaft sensor at higher resolution in terms of time.
Figure 5:
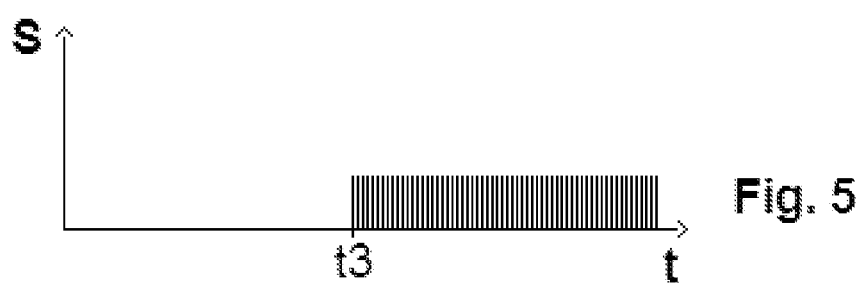
FIG. 5 shows counting pulses of a position counter.

FIGS. 4 and 5 explain the calculation of a highly precise position signal of the internal combustion engine from the signals of crankshaft sensor 3.

FIG. 4 schematically depicts the signal S of crankshaft sensor 3 plotted against time t. The time resolution selected here, however, is considerably greater, so that only two pulses of three teeth 2 of crankshaft encoder wheel 1 in crankshaft sensor 3 are shown here. At time to, the signal level of the signal S jumps from the Low value to the High value, and it maintains that High signal level until time t2. The signal level remains at the Low level in the time span from t2 to t3, and then jumps back up to the High level at time t3. For the discussion that follows, it will be assumed that circuit assemblage 10 evaluates only the positive switching edges, i.e. only those signals that jump from a Low level to the High level. Whenever the signal level jumps from a Low level to a High level, circuit assemblage 10 stores the state of a clock in a memory. In other words, a time is stored at times t1 and t3. Based on a comparison of these two times, circuit assemblage 10 then determines the duration of the time span between the two positive signal edges. This information is then used to predict how long it will be until the next positive signal edge occurs, for example at time t5. Based on the time span, predicted in this fashion, until arrival of the next signal edge at time t5, a plurality of individual position signals P are then outputted as shown in FIG. 5. FIG. 5 shows a plurality of position signals P that, however, are outputted only starting at time t3. In the example of FIGS. 4 and 5, it is assumed that a calculation of position signal P was not yet possible at time t1, since at that time no further information was yet available regarding the rotation of crankshaft 1000. Not until time t3 can a prediction be made as to when the next signal of crankshaft sensor 3 is to be expected. Starting at that time, in accordance with this prediction (which is based only on measurement of the time interval between times t1 and t3), it is possible to predict the time interval until the next signal (at time t5) of crankshaft sensor 3, and a plurality of position pulses P are correspondingly outputted. As is readily apparent from a comparison of FIGS. 4 and 5, a plurality of position pulses P are provided for two successive signals of crankshaft sensor 3. This permits a much more accurate resolution, for purposes of calculating subsequent actions, of the angular position of the internal combustion engine, by the fact that position pulses P are counted in a position counter. The position counter that counts position pulses P therefore always internally contains a count value that corresponds to a position of crankshaft 1000. This value of the position counter is used to apply control to actuators with which the internal combustion engine is actuated.

At time t5 a further signal of crankshaft sensor 3 then arrives, and once again firstly the arrival time of that positive signal edge is stored. What is available at time t5 is therefore not only the information as to the length of the time interval elapsed since t3, but also the information as to how long the time interval t1 to t3 was. It is thus possible to take into account, for a new calculation of a prediction as to when the next signal of crankshaft sensor 3 will arrive, not only the last time interval but also a preceding time interval. This means that not only the current rotation speed of the internal combustion engine, but also a possible acceleration or slowing of the internal combustion engine, can be taken into account. The prediction of the next interval until arrival of the next positive signal edge of crankshaft sensor 3 can be improved in accordance with this information.

It must furthermore be noted with respect to time t5 that it is of course possible to determine the extent to which the prediction of the time span between the positive signal edges between t3 and t5 is correct. If deviations have occurred in this context, additional position pulses P may need be introduced or, once a predefined number of position pulses have been outputted after time t3, the output of further position pulses P may need be stopped until the positive switching edge t5 actually arrives. This ensures that the position counter always has the correct number of position pulses P, and thus a maximally correct position of the internal combustion engine. It is important in this context that a measured position of the internal combustion engine be available only at the times of the positive switching edge of crankshaft sensor 3, i.e. in FIG. 4 at times t1, t3, and t5. Between these times, the position pulses P and thus the status of position counter 11 are obtained by a calculation, which nevertheless, in particular when a change in the rotation speed of the internal combustion engine is evaluated over several teeth 2 of crankshaft encoder wheel 1, contains a quite accurate datum regarding the real position of the internal combustion engine.

Alternatively to the calculation based on the signal of crankshaft sensor 3, the calculation can of course also occur on the basis of the signal of camshaft sensor 5. As may readily be seen from a comparison of FIGS. 2 and 3, however, the signal of crankshaft sensor 3 has a priori a more accurate resolution, since crankshaft encoder wheel 1 is very much more finely subdivided than camshaft encoder wheel 20. In the case of the signal of camshaft sensor 5, as shown in FIG. 3, not only the positive switching edge of the signal but also the negative switching edge of the signal, i.e. the transition from a High level to a Low level, would be evaluated. Two signals that contain a real measured position of camshaft 1001 are thus available for one revolution of camshaft 1001. Between these two measured points, position pulses P and a corresponding status of position counter 11 would then need to be generated by corresponding calculations. Because fewer measured data regarding the position of the camshaft are available, however, the status of the position counter is affected by a much greater uncertainty.

Figure 6:
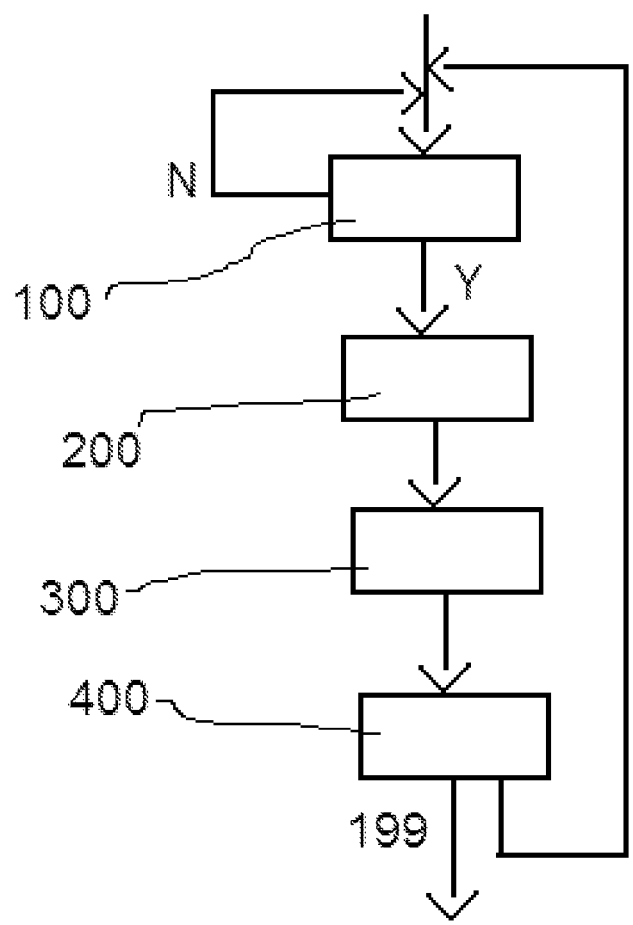
FIG. 6 shows first method steps.

FIG. 6 depicts the internal operating steps for processing the signals of crankshaft sensor 3 and camshaft sensor 5. A first program block 100 checks whether a positive signal edge of a signal of crankshaft sensor 3 has arrived. If a determination has been made that a positive switching edge, i.e. a level change from a Low level to a High level, has arrived, step 100 is then followed by step 200. If a positive switching edge has not been identified, the step is again followed by step 100, i.e. program block 100 waits until a positive switching edge of the camshaft sensor signal has been identified. For identification, a corresponding prefiltering and debouncing of the signal of camshaft sensor 3 occurs, in order to determine with certainty that the signal is actually one from crankshaft sensor 3, caused by the passage of a tooth 2 of camshaft encoder wheel 1. This pre-processing of the signals can be accomplished either using analog circuit means, or also digitally by a simple analog/digital conversion of the signal of crankshaft sensor 3.

In step 100 it is also possible to check whether the signal of crankshaft sensor 3 has also occurred in a plausible time window, since because the internal combustion engine usually rotates in a range between 800 and 6000 revolutions per minute, only a specific time range is possible for the sequence of teeth 2 at crankshaft sensor 3. When a corresponding reasonable signal of crankshaft sensor 3 has been identified, step 100 is then followed by step 200.

Step 200 determines a time datum, for example from internal clock 12, that corresponds to the arrival time of the positive switching edge. This value is then, in a subsequent step 300, stored in a memory. Storage in a memory occurs in such a way that the times at which multiple signals of crankshaft sensor 3 arrived are available in the memory. Because multiple times at which signals of crankshaft sensor 3 arrived are stored, the future rotation speed of crankshaft 1000 can be predicted with great reliability. The greater the number of arrival times of signals of crankshaft sensor 3 that are known, the better the development of the rotation of crankshaft 1000 can be predicted. If only the times of the tooth 2 that has just arrived, and the previous tooth 2, are known, the prediction cannot take into account any acceleration of the internal combustion engine. If a previous arrival time of a signal of crankshaft sensor 3 is also known, an acceleration or slowing of the rotation speed of the internal combustion engine can also be taken into account. If a plurality of times are known, other fluctuations in rotation speed, for example due to cylinder compression or other oscillation phenomena of the internal combustion engine or of a motor vehicle driven therewith, can also be predicted.

The arrival times of the signals of crankshaft sensor 3 can be stored, for example, in such a way that one memory location in a memory is provided for each tooth 2 of crankshaft encoder wheel 1, so that in a context of continuous operation, the arrival times of the crankshaft sensor signals for one complete revolution of crankshaft 1000 are always contained in the memory. Because one operating cycle of the internal combustion engine encompasses two crankshaft revolutions, however, it is also possible to provide two complete revolutions of the crankshaft in terms of the times at which teeth 2 travel past camshaft sensor 3, or optionally even further revolutions, in the memory. Alternatively, it is also possible to provide less memory space, for example only ten memory locations, and thus only the times of the last ten teeth 2, in the memory. In this case one memory location would then not be allocated to one specific tooth, but instead a counter would be incremented at each storage operation, said counter indicating the memory location at which the last memory entry occurred, so that for the subsequent calculations it is clear as to which stored times correspond to which preceding teeth 2.

Figure 7:
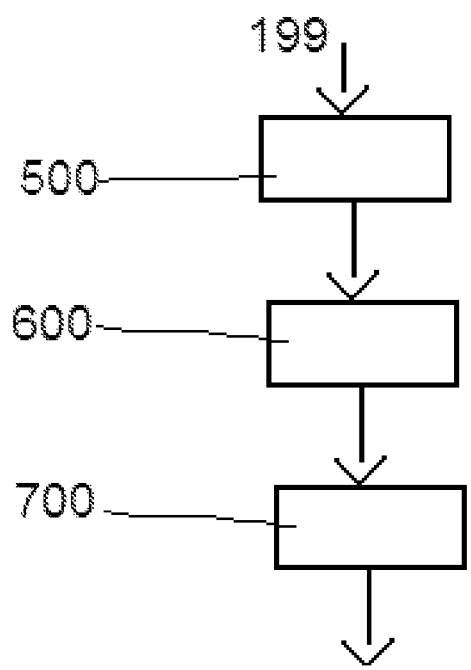
FIG. 7 shows further method steps of the method according to the present invention.

Memory storage step 300 is followed by a calculation step 400 in which, in addition to the arrival times of the signals of crankshaft sensor 3, the respective differences with respect to the preceding signal are stored. These data are required for subsequent calculations. A trigger signal 199 for subsequent calculations, which are described in FIG. 7, is also initiated in step 400. Otherwise step 400 is again followed by step 100, i.e. the system waits for the arrival of the next signal of crankshaft sensor 3.

Program steps 100 to 400 are cycled through correspondingly for the evaluation of camshaft sensor 5. The only difference is the fact that step 100 evaluates not only positive switching edges, i.e. the signal change from the Low level to the High level, but also negative switching edges, i.e. from the High level to the Low level. The reason for this is that based on the signal sequence shown in FIG. 3, camshaft sensor 5 supplies relatively few signals for each revolution of the camshaft, and every possible switching edge is therefore evaluated.

Provision is now made according to the present invention that the method according to FIG. 6 is continuously executed both for the signals of crankshaft sensor 3 and for the signals of camshaft sensor 5. In other words, the method of steps 100 to 400 is cycled through whenever a signal of crankshaft sensor 3 and a signal of camshaft sensor 5 arrives. Execution of these method steps can be continuously carried out by way of corresponding switching logic systems 13, 14, as shown in FIG. 1. Switching logic systems 13, 14, constituting a hard-wired circuit, execute method steps 100 to 400, i.e. detecting a switching edge, storing the value of internal clock 12, and calculating the differences with respect to preceding switching edges. Steps 100 to 400 can, however, also be executed entirely or partly by a program, although execution via hardware is preferred. Times that correspond to the arrival of signals of crankshaft sensor 3 are thus continuously stored, and in parallel therewith, times that correspond to the arrival of signals of camshaft sensor 5 are continuously stored. Storage of these values occurs regardless of which of these signals is used to calculate the position pulses or the status of position counter 11. A sufficient number of measured values of crankshaft sensor 3 and of camshaft sensor 5 is therefore always contained in the memory of the circuit assemblage, so as to switch over between these two methods at any time. This is significant in particular for malfunctions of one of the two sensors. For example, if crankshaft sensor 3 fails and no measured values of camshaft sensor 5 are stored, one complete revolution of the camshaft must first occur before any calculation at all can be performed on the basis of the camshaft sensor signal. It is therefore proposed according to the present invention that storage of the arrival times of switching edges of crankshaft sensors 3 and camshaft sensors 5, respectively, occur continuously, so that a switchover between these two different sensor signals, for calculating position pulses P or the status of position counter 11, is possible at any time.

FIG. 7 shows the further processing of the arrival times, stored in steps 200 to 400, of signals of crankshaft sensor 3 and of camshaft sensor 5. Proceeding from trigger signal 199, a first processing step 500 occurs, which determines whether a calculation based on the crankshaft signal or based on the camshaft signal is possible. Alternatively, of course, the generation of trigger signal 199 in step 400 can also depend on whether calculation based on the crankshaft signal or on the camshaft signal is desired at that time. Step 500 is then followed by step 600, in which the corresponding stored times of the preceding signals of crankshaft sensor 3 or of camshaft sensor 5 occur. Based on these times and time differences, a calculation of the rotation speed of the internal combustion engine then occurs, as well as a prediction as to when the next signal of the sensor is expected. In accordance with the time span thereby calculated, a corresponding frequency for the output of position pulses P is counted, so that a corresponding number of position pulses P are generated before arrival of the next signal, and a corresponding status of position counter 11 is thus brought about. The number of position pulses P must of course be adapted in terms of whether the calculation is now occurring on the basis of signals of crankshaft sensor 3 or of camshaft sensor 5. Because of the larger angle region until arrival of the next camshaft signal, a calculation based on the camshaft signal requires that a correspondingly larger number of position pulses be outputted.

What is claimed is:

1. A circuit assemblage for controlling an internal combustion engine, comprising:
    a clock;
    switching logic systems using the clock to detect the times at which signals of a crankshaft sensor and signals of a camshaft sensor occur;
    a memory unit which simultaneously stores the occurrence times of the signals of the crankshaft sensor and the occurrence times of the signals of the camshaft sensor;
    wherein the switching logic systems are configured to:
        decide, as a function of the signals of the crankshaft sensor and the signals of the camshaft sensor, a failed sensor which is the crankshaft sensor or the camshaft sensor and a functional sensor which is the other of the crankshaft sensor or the camshaft sensor;
        use one of the stored occurrence times of the signals of the functional sensor to predict an occurrence time in the future of a signal of the functional sensor;
        predict a position of the internal combustion engine by using the occurrence time in the future of a signal of the functional sensor, wherein the calculation unit is configured as a digital phase locked loop; and
        control actuation of fuel inject valves or ignition coils of the internal combustion engine based on the predicted position of the internal combustion engine.

2. The circuit assemblage as recited in claim 1, wherein a first switching logic system for evaluating the signals of the crankshaft sensor is provided, the first switching logic system storing the arrival times of the signals of the crankshaft sensor in the memory unit of the circuit assemblage, and wherein a second switching logic system for evaluating the signals of the camshaft sensor is provided, the second switching logic system storing the arrival times of the signals of the camshaft sensor in the memory unit of the circuit assemblage.

3. A method for controlling an internal combustion engine, comprising:
    detecting the times at which signals of a crankshaft sensor and signals of a camshaft sensor occur;
    simultaneously storing in a memory unit the occurrence times of the signals of the crankshaft sensor and the occurrence times of the signals of the camshaft sensor;
    deciding, by switching logic systems, as a function of the signals of the crankshaft sensor and the signals of the camshaft sensor, a failed sensor which is the crankshaft sensor or the camshaft sensor and a functional sensor which is the other of the crankshaft sensor or the camshaft sensor;
    predicting, by the switching logic systems using one of the stored occurrence times of the signals of the functional sensor an occurrence time in the future of a signal of the functional sensor;
    predicting, by the switching logic systems, a position of the internal combustion engine by using the occurrence time in the future of a signal of the functional sensor, wherein the calculation unit is configured as a digital phase locked loop; and
    controlling actuation of fuel inject valves or ignition coils of the internal combustion engine based on the predicted position of the internal combustion engine.

4. The circuit assemblage as recited in claim 1, further comprising an analog/digital converter to pre-process the signals of the crankshaft sensor and the signals of the camshaft sensor.

5. The circuit assemblage as recited in claim 1, wherein the switching logic systems are configured to determine whether the signals of the crankshaft sensor and the signals of the camshaft sensor have occurred in plausible time windows.

\* \* \* \* \*